United States Patent Office 3,157,641
Patented Nov. 17, 1964

---

3,157,641
PREPARATION OF N,N'-ETHYLIDENE BIS (N-HETEROCYCLIC) COMPOUNDS
Wilhelm E. Walles, William W. Bakke, and William F. Tousignant, Midland, Mich., assignors to The Dow Chemical Company, Midland, Mich., a corporation of Delaware
No Drawing. Filed May 6, 1960, Ser. No. 27,286
17 Claims. (Cl. 260—239.3)

This application is a continuation-in-part of the identically entitled copending application for United States Letters Patent having Serial No. 740,590, which was filed on June 9, 1958.

The present invention contributes to the organic chemical arts. It has particular reference to an improved method or technique for the manufacture of certain N,N'-ethylidene bis (N-heterocyclic) compounds. The invention is specifically concerned with the preparation, by a new and useful procedure, of certain N,N'-ethylidene bis(cyclic amides) and N,N'-ethylidene bis(cyclic carbamates) of the general formula:

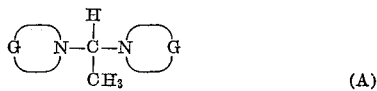

(A)

wherein each G is independently selected from the group of cyclizing bivalent radicals that are biterminally attached to the nitrogens consisting of:

(A1)

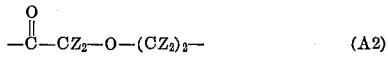

(A2)

and

(A3)

in which each Z is independently selected from the group consisting of hydrogen and alkyl radicals of from 1 to about 4 carbon atoms; $n$ is an integer from 3 to 5 and $m$ is an integer from 2 to 3.

Thus, as is apparent, the N-heterocyclic units that are linked in the compounds of the present invention may consist of the various cyclic lactams; 3-morpholinones (including alkyl ring substituted varieties); 2-oxazolidinones (including alkyl ring substituted varieties); 2-oxazinidinones (including alkyl ring substituted varieties); and mixtures thereof. More specifically, the invention is concerned with the preparation of compounds of the respective formulae:

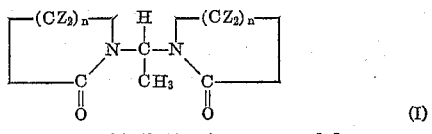

(I)

[N,N'-ethylidene bis(lactam) compounds]

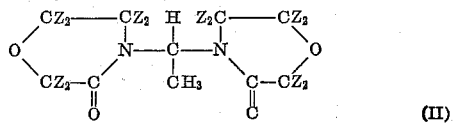

(II)

[N,N'-ethylidene bis(3-morpholinone) compounds]

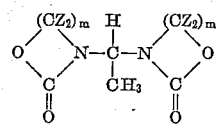

(III)

[N,N'-ethylidene bis(cyclic carbamate) compounds]

wherein Z, $n$ and $m$ are as above defined.

The novel compounds prepared by the method of the present invention are useful and advantageously applicable as anthelmintics and parasiticides for the control of a large number of intestinal, insect, mite, bacterial and fungal organisms, such as flies, aphids, beetles, worms and ascaris. For such desirable use, the products may generally be dispersed on an inert, finely-divided solid and employed in such embodiment as dusts. Also, the materials produced by practice of the present invention may be dispersed in water, beneficially (in many instances) with the aid of a wetting agent, and the resulting aqueous suspensions used as sprays. In other operations, the compounds obtained as products of the presently contemplated method may be employed as constituents in aqueous emulsions or dispersions, or in oil or other liquid solvent or vehicle compositions. In representative operations, aqueous compositions containing the various compounds resulting from practice of the present invention give excellent controls of many insect organisms at dosages of at least three (3) pounds of active agent per hundred gallons of ultimate mixture.

The basic object of the present invention is to provide a new and useful method for the manufacture of any and all of the compounds of the Formulae A, I, II, and III.

In accordance with the practice of the present invention, N,N'-ethylidene bis(N-heterocyclic) compounds of the Formula A, and, more specifically, those of the Formulae I, II, and III may be prepared by a method which involves the reacting of a corresponding N-heterocyclic starting material with an alkyl vinyl ether under weakly or mildly acidic conditions as obtained under the influence of certain catalysts, such as mercuric acetate (HgAc₂) which may either be soluble or insoluble in the reaction mass. The alkyl (including cycloalkyl) vinyl ether that is employed may contain from 1 to about 10 carbon atoms or so in the alkyl radical. Ethyl vinyl ether, n-butyl vinyl ether, ethyl cyclohexyl vinyl ether and the like are typical of the alkyl vinyl ethers that may be suitably employed. It is generally advantageous for an excess of the vinyl ether to be present in the reaction mass. Usually, at least about 2 moles of the ether are desirable to employ for each mole of the starting material being converted.

As is apparent, the starting cyclic lactams and cyclic carbamates that are employed are of the respective formulae:

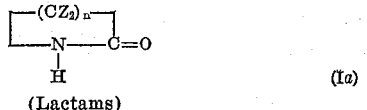

(Ia)

(Lactams)

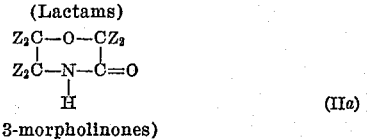

(IIa)

(3-morpholinones)

and

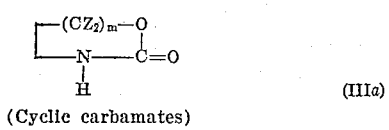

(Cyclic carbamates)

wherein Z, n and m have the above described values.

The preparation of N,N'-ethylidene bis(5-methyl-2-oxazolidinone) or 3,3'-ethylidene bis(5-methyl-2-oxazolidinone), as it may also be called from 5-methyl-2-oxazolidinone and n-butyl vinyl ether is represented by the following equation:

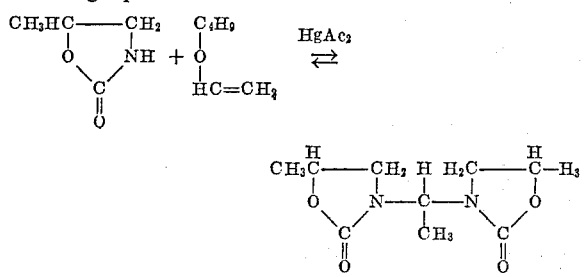

Other catalysts, including mercuric benzoate, mercuric citrate, mercuric oxalate, phenyl mercuric acetate, mercuric fluoride, mercuric iodide, mercuric sulfate, mercuric nitrate, mercuric chloride, mercuric thiocyanate, mercurous sulfate, cuprous chloride, nickel bromide, nickel iodide, cobalt chloride, antimony trichloride, ferric chloride, bismuth nitrate, arsenic trichloride, sodium bisulfate and the like may be employed in place of or in combination with the mercuric acetate. Likewise, such materials as normally solid sulfonated polystyrene, sulfonated polyvinyltoluene and the like mildly acidic materials may also be employed as catalysts in the practice of the present invention for inducing the weakly acidic conditions needed for preparation of the desired product. Generally, an amount of the catalyst up to about 5 or 10 percent by weight, based on the weight of the starting 2-oxazolidinone reactant material, may be required for accomplishment of the reaction. Frequently, only one percent or less of the catalyst may be found necessary. Usually, relatively greater quantities of catalyst must be employed when the reaction is performed by batch-wise techniques instead of according to continuous processing arrangements. Regardless of the specific acidic catalyst employed, care should be taken to avoid the occurrence of such excessively acid conditions in the reaction mass as may cause degradation and decomposition of the starting materials. To this end, it is frequently preferable to utilize acidic catalysts that are insoluble or only slightly soluble in the reaction mass.

It is desirable for the reaction to be conducted in a solvent vehicle that is free from substituent hydroxy groups (such as dioxane, dimethyl formamide and the dimethyl ethers of di-, tri-, or tetra-ethylene glycol and the like. The ethylidene linking reaction will proceed in the absence of a solvent, however, particularly when liquid starting materials are employed (as may be obtained normally or by fusion). Despite this fact, the use of a solvent generally engenders better results. It is also desirable for the reaction mass to be maintained under an atmosphere of an inert gas, such as nitrogen, throughout the reaction, although the latter technique is likewise not an absolute requirement. The reaction may be performed and satisfactorily accomplished at temperatures in the range from about 90° C. to 200° C. or so. Better results may often be obtained when the temperature of reaction is maintained between about 140° C. and 160° C. The reaction will occur under any desired pressure although, when it is being conducted in autoclaves and the like apparatus, especially when solvent vehicles are employed, it is most convenient to accomplish the reaction under autogenous pressures.

Ordinarily, suitable (and quite frequently very good) conversions and yields of desired product from the converted starting materials can be realized according to the method of the invention within reaction periods of twenty-four hours or less. The precise yields to be obtained, of course, may oftentimes be found to vary with the particular starting material utilized and the N,N'-ethylidene bis(N-heterocyclic) compound desired to be obtained.

The desired N,N'-ethylidene bis(N-heterocyclic) products can be recovered easily from the reaction mass using techniques best adapted to individual needs and calculated to suit the individual properties and characteristics of the material being isolated, as will be apparent to those who are skilled in the art. Ordinarily, since the products made by practice of the present invention are generally high melting solids (i.e., usually having melting points of at least 150° C.) they may be isolated and recovered from the reaction mass easily by permitting them to crystallize and precipitate therein (as upon cooling of the reaction mass) and then recovering them therefrom by filtration, decantation, centrifugation, etc. It may also be possible to recover the products from the reaction mass by solvent extraction. In many cases it is advantageous prior to recovery of the desired products to subject the reaction mass to stripping or distillation in order to remove fugacious constituents therefrom, such as certain unreacted starting materials and certain N-vinyl monomers of the starting materials which may also form in the reaction. After recovery from the reaction mass, the products may oftentimes be further purified with advantage by recrystallization from suitable solvents, etc.

By way of further illustration, about 202 grams (2 moles) of 5-methyl-2-oxazolidinone; 400 grams (4 moles) of n-butyl vinyl ether; 200 grams of dioxane; 12 grams of mercuric acetate; and 6 grams of benzoic acid were charged to a 1.5 liter stainless autoclave, then blanketed therein with nitrogen. The charged ingredients were then heated to a temperature of about 155° C. and synthermally maintained thereat for a period of about 16 hours, after which period the reaction was terminated. The autoclave was then rapidly cooled in a stream of cool water. The reaction mixture was then filtered. About 35 grams of white, crystalline, 3,3'-ethylidene bis(5-methyl-2-oxazolidinone) was thereby recovered. Recrystallization of the product from acetone produced a purified material that had a melting point of 198–199° C. Infrared analysis of the product exhibited the characteristic absorption points that are obtained in the presence of an N-alkyl substituted 5-methyl-2-oxazolidinone. Upon analysis, the product was found to contain about 52.7 weight percent of combined carbon; 6.95 weight percent of combined hydrogen; and 11.85 weight percent of combined nitrogen. This compared with calculated quantities (for $C_{10}H_{16}N_2O_4$) of 52.6 percent carbon; 7.02 percent hydrogen and 12.28 percent nitrogen. The purified 3,3'-ethylidene bis (5-methyl-2-oxazolidinone) product was soluble in acetone, insoluble in diethyl ether and only slightly soluble in water.

Analogous results are obtained when the foregoing procedure is repeated excepting to employ mercuric sulfate as the catalyst. Analogous results are also obtained when the above procedure is repeated excepting to utilize any of the catalysts or mixtures thereof mentioned in the foregoing specification in place of or in combination with the mercuric acetate catalyst in order to obtain the necessary slightly acidic conditions in the reaction mass for the preparation of the desired product.

Results similar to and at least commensurate in benefit with the foregoing may also be obtained to prepare any of the compounds of the Formula A or, more specifically, I, II and III by repeating the foregoing procedures with such starting materials as 2-oxazolidinone; 5-ethyl-2-oxazolidinone; 4,5-dimethyl-2-oxazolidinone; 5-butyl-2-oxazolidinone; 4,5-diethyl-2-oxazolidinone; 2-oxazinidinone; 6-methyl-2-oxazinidinone; 3-morpholinone; various ring-substituted-3-morpholinones; 2-pyrrolidone; 2- caprolactam; 5-methyl pyrrolidone; 3,3'-dimethyl pyrrolidone; 3,3'-piperidinone; and the like and mixtures thereof as well as related N-heterocyclic compounds indicated to be within the scope and contemplation of the present invention. As is apparent, products in which diverse N-heterocyclic constituents are linked by the ethylidene bridging unit may also be prepared by starting with mixtures of the various starting materials that are suitable for use.

In representative tests conducted in a conventional manner according to generally accepted procedures, the product N,N'-ethylidene bis(5-methyl-2-oxazolidinone) provided absolute (100 percent) reduction in the activity of ascarite worms (or round worms of swine). In the tests, the compound was fed to mice that had been naturally infected for 24 hours prior to innoculation with a standardized culture of Ascaris ova (roundworm of swine). The test compound was incorporated in the feed of the mice continuously for 7 days at a dose rate of about 407 milligrams per kilogram of body weight per day, with the percentage of the compound in the diet level of the mice being about 0.25 percent by weight. The weights of each of the mice were taken twice during the test period. Fecal examinations during the test and necropsy findings at its termination were the basis for evaluation. The N,N'-ethylidene bis(5-methyl-2-oxazolidinone) was found to be entirely non-toxic to the mice that were subjected to the test. In addition, the compound was also found to have substantial activity against *Nematospiroides dubius* larvae (mouse trichostrongyloid) in representative tests similarly conducted.

Successful applicability for the indicated and mentioned cognate purposes is also achieved with any of the compounds obtained by practice of the present invention within the scope of the Formula A and, more specifically, as contemplated by the Formulae I, II and III.

What is claimed is:

1. Method for the preparation of N,N'-ethylidene bis (N-heterocyclic) compounds selected from the group of those having the structural formulae:

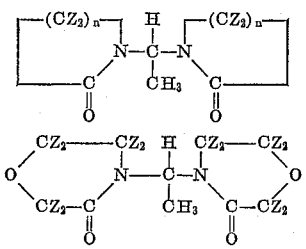

(I)

(II)

and

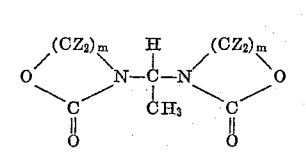

(III)

wherein each Z is independently selected from the group consisting of hydrogen and alkyl radicals of from 1 to about 4 carbon atoms; $n$ is an integer from 3 to 5; and $m$ is an integer from 2 to 3; which method comprises mixing a starting material selected from the group of cyclic lactams, cyclic amides and cyclic carbamates consisting of those having the structural formulae:

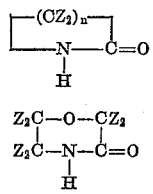

(Ia)

(IIa)

and

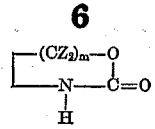

(IIIa)

wherein the values of Z, $n$ and $m$ are the same as in the Formulae I, II and III, with an alkyl vinyl ether that contains from about 1 to 10 carbon atoms in the alkyl group and between about 1 and 10 weight percent, based on the weight of the reactant mixture, of a catalyst selected from the group consisting of mercuric acetate, phenyl mercuric acetate, mercuric benzoate, mercuric citrate, mercuric oxalate, mercuric fluoride, mercuric iodide, mercuric sulfate, mercuric nitrate, mercuric chloride, mercuric thiocyanate, mercurous sulfate, cuprous chloride, nickel bromide, nickel iodide, cobalt chloride, antimony trichloride, ferric chloride, bismuth nitrate, arsenic trichloride, sodium bisulfate, normally solid sulfonated polystyrene, normally solid sulfonated polyvinyltoluene and mixtures thereof; then heating the mixture at an elevated temperature between about 90° C. and 200° C. until at least a portion of said starting material of the Formulae Ia, IIa and IIIa has been converted to an N,N'-ethylidene bis(N-heterocyclic compound); and subsequently removing the thereby obtained product N,N'-ethylidene bis(N-heterocyclic compound of the Formulae I, II and III from the reaction mixture.

2. The method of claim 1, wherein said product is removed from the reacted mixture by cooling said mixture to a temperature beneath the crystallization point of said product and filtering the product from said mixture.

3. The method of claim 1, wherein said mixture is heated at a temperature between about 140° C. and 160° C. for a period of time that is not longer than about 24 hours.

4. The method of claim 1, and including in addition thereto and in combination therewith, the step of maintaining the mixture under an atmosphere of an inert gas during the reaction.

5. The method of claim 1, and including in addition thereto and in combination therewith, the step of mixing said reactant materials and said catalyst in a solvent vehicle therefor that is free from substituent hydroxy groups and performing the reaction in the resulting solution.

6. The method of claim 1, wherein said starting material is 2-oxazolidinone and said product is N,N'-ethylidene bis(2-oxazolidinone).

7. The method of claim 1, wherein said starting material is 5-methyl-2-oxazolidinone and said product is N,N'-ethylidene bis(5-methyl-2-oxazolidinone).

8. The method of claim 1, wherein said starting material is 5-ethyl-2-oxazolidinone and said product N,N'-ethylidene bis(5-ethyl-2-oxazolidinone).

9. The method of claim 1, wherein said starting material is 2-oxazinidinone and said product is N,N'-ethylidene bis(2-oxazinidinone).

10. The method of claim 1, wherein said starting material is 3-morpholinone and said product is N,N'-ethylidene bis(3-morpholinone).

11. The method of claim 1, wherein said starting material is 2-pyrrolidone and said product is N,N'-ethylidene bis(2-pyrrolidone).

12. The method of claim 1, wherein said starting material is 2-piperidone and said product is N,N'-ethylidene bis(2-piperidone).

13. The method of claim 1, wherein said starting material is epsilon-caprolactam and said product is N,N'-ethylidene bis(2-caprolactam).

14. The method of claim 1, wherein said alkyl vinyl ether is ethyl vinyl ether.

15. The method of claim 1, wherein said alkyl vinyl ether is n-butyl vinyl ether.

16. The method of claim 1, wherein said alkyl vinyl ether is ethylcyclohexyl vinyl ether.

17. Method for the preparation of N,N'-ethylidene bis(N-heterocyclic) compounds of the formula:

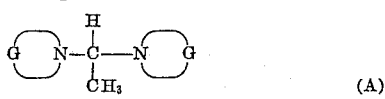
(A)

wherein each G is independently selected from the group of bivalent radicals consisting of those having the structure:

(A1)

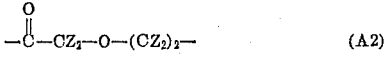
(A2)

and

(A3)

in which each Z is independently selected from the group consisting of hydrogen and alkyl radicals of from 1 to about 4 carbon atoms; $n$ is an integer from 3 to 5; and $m$ is an integer from 2 to 3; which method comprises mixing a starting material selected from the group of those having the structural Formulae Ia, IIa and IIIa with an alkyl vinyl ether that contains from about 1 to 10 carbon atoms in the alkyl group and a catalyst selected from the group consisting of mercuric acetate, phenyl mercuric acetate, mercuric benzoate, mercuric citrate, mercuric oxalate, mercuric fluoride, mercuric iodide, mercuric sulfate, mercuric nitrate, mercuric chloride, mercuric thiocyanate, mercurous sulfate, cuprous chloride, nickel bromide, nickel iodide, cobalt chloride, antimony trichloride, ferric chloride, bismuth nitrate, arsenic trichloride, sodium bisulfate, normally solid sulfonated polystyrene, normally solid sulfonated polyvinyltoluene and mixtures thereof; said catalyst being employed in an amount that is adequate to provide weakly acidic conditions of a degree insufficient to decompose said starting material; then heating the mixture at an elevated temperature between about 110° C. and 170° C. until at least a portion of said starting material of the Formulae Ia, IIa and IIIa has been converted to an N,N'-ethylidene bis(N-heterocyclic) product; and subsequently removing the thereby obtained N,N'-ethylidene bis-(N-heterocyclic) compound of the Formula A from the reacted mixture.

References Cited in the file of this patent
German Auslegeschrift No. 1,074,045, Jan. 28, 1960.